United States Patent [19]

Abe

[11] Patent Number: 4,953,531

[45] Date of Patent: Sep. 4, 1990

[54] CRANK ANGLE DETECTOR FOR AN ENGINE

[75] Inventor: Kunihiro Abe, Tokyo, Japan

[73] Assignee: Fuji Jukogyo Kabushiki Kaisha, Tokyo, Japan

[21] Appl. No.: 412,144

[22] Filed: Sep. 25, 1989

[30] Foreign Application Priority Data

Sep. 27, 1988 [JP] Japan ................................ 63-241870

[51] Int. Cl.$^5$ ................................................ F02P 5/15
[52] U.S. Cl. ................................... 123/414; 123/424; 123/179 BG
[58] Field of Search ............... 123/414, 418, 424, 612, 123/179 BG

[56] References Cited

U.S. PATENT DOCUMENTS

| | | | |
|---|---|---|---|
| 4,365,602 | 12/1982 | Stiller et al. | 123/414 |
| 4,380,983 | 4/1983 | Kobashi et al. | 123/424 |
| 4,414,946 | 11/1983 | Daumer et al. | 123/414 X |
| 4,489,691 | 12/1984 | Ono et al. | 123/424 |
| 4,494,509 | 1/1985 | Long | 123/414 X |
| 4,520,781 | 6/1985 | Nishida | 123/414 |
| 4,644,917 | 2/1987 | Yakuwa et al. | 123/414 |
| 4,766,865 | 8/1988 | Hartel | 123/414 |
| 4,873,958 | 10/1989 | Abe | 123/424 |

FOREIGN PATENT DOCUMENTS

| | | | |
|---|---|---|---|
| 3608321 | 9/1987 | Fed. Rep. of Germany | 123/414 |
| 0022035 | 2/1979 | Japan | 123/424 |

Primary Examiner—Willis R. Wolfe
Attorney, Agent, or Firm—Beveridge, DeGrandi & Weilacher

[57] ABSTRACT

A crank angle detector for an engine includes a cam rotor plate for detecting a cylinder number to be ignited and a cam pulse sensor provided opposite thereto, a crank rotor plate for sensing a crank angle and a crank pulse sensor provided opposite thereto, and a controller for determining ignition timings of respective cylinders to control an ignition. The crank rotor plate is constituted by a rotor plate at starting for sensing a fixed ignition timing and a rotor plate for a normal operation. A pair of crank pulse sensors are provided opposite to the rotor plates, respectively. An input signal for the fixed ignition timing is mask-released only at starting. After that, input is continuously masked during normal operation.

2 Claims, 8 Drawing Sheets

CRANK ANGLE DETECTOR FOR AN ENGINE

BACKGROUND OF THE INVENTION

This invention relates to a crank angle detector for an engine. Particularly, this invention relates to a crank angle detector adapted to mask unnecessary angular signal output from a pair of crank angle sensors and which become a burden to a controller.

As the crank angle detector of this kind generally known, there are detectors of an angular control system and a time control system.

The crank angle detector of the angular control system is disclosed in Japanese Patent Application Laid-Open No. 60-17311. The detector counts a number of projections formed on an outer periphery of a rotor plate synchronously rotating with a crank shaft to calculate an engine speed, or measure an ignition timing.

Figure 1:
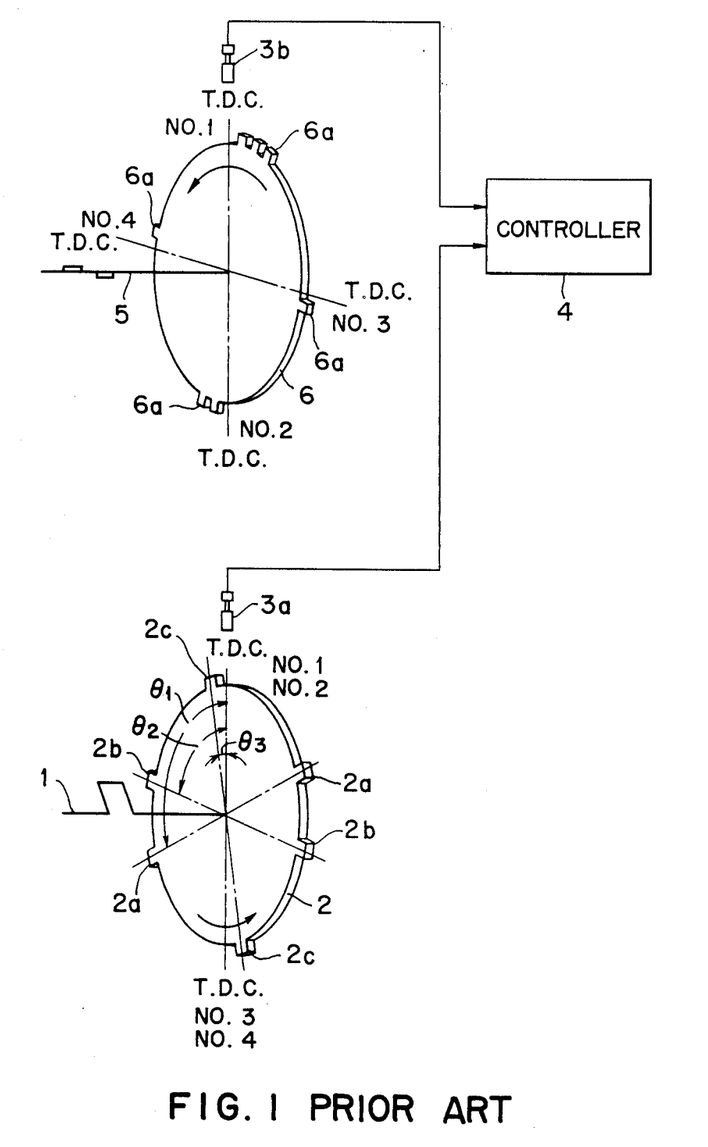
FIG. 1 is a schematic diagram showing a conventional crank angle detector.

On the other hand, the crank angle detector of the time control system is disclosed in Japanese Patent Application Laid-Open No. 60-120918. As shown in FIG. 1, a crank angle sensor 3 detects projections 2a, 2b and 2c spaced at each predetermined angle $\theta 1$, $\theta 2$ and $\theta 3$ (e.g., $\theta 1 = 112°$, $\theta 2 = 80°$, $\theta 3 = 10°$) from a top death center (T.D.C.) on an outer periphery of a rotor plate 2 secured to an end of a crank shaft 1. A controller 4 such as a microcomputer measures time elasped between the projections 2a and 2b. Thus, the controller 4 calculates the engine speed from a calculated angular velocity. Furthermore, the controller 4 sets the projection 2b as a reference of an ignition timing, and sets the projection 2c as a fixed ignition angle at starting.

A cam rotor 6 is axially secured to a cam shaft 5 rotating at half the speed of the crank shaft 1. Furthermore, another crank angle sensor 3b detects projections 6a equidistantly formed on an outer periphery of the cam rotor 6 to discriminate a cylinder number.

Figure 2:
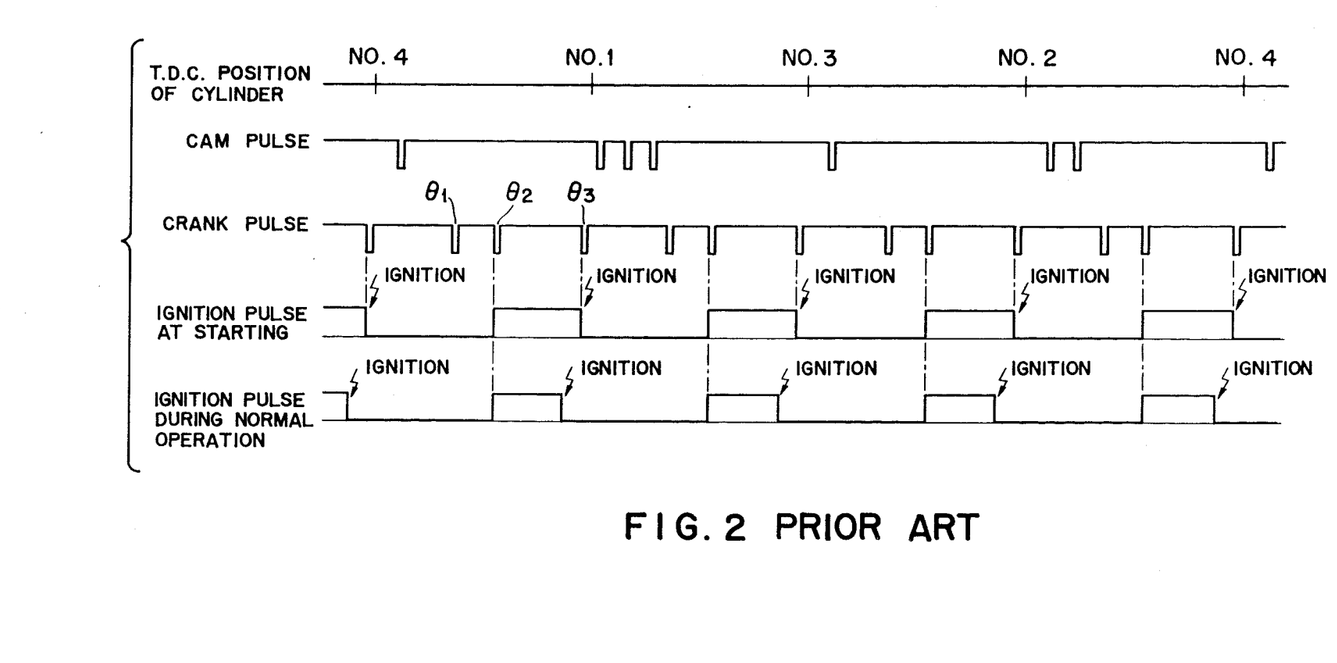
FIG. 2 is a timing chart showing cam pulses and crank pulses sensed by the conventional detector.

As shown in FIG. 2, the signals $\theta 1$, $\theta 2$ and $\theta 3$ obtained by detecting respective projections 2a to 2c of the rotor plate 2 are output from the crank angle sensor 3a.

Figure 3:
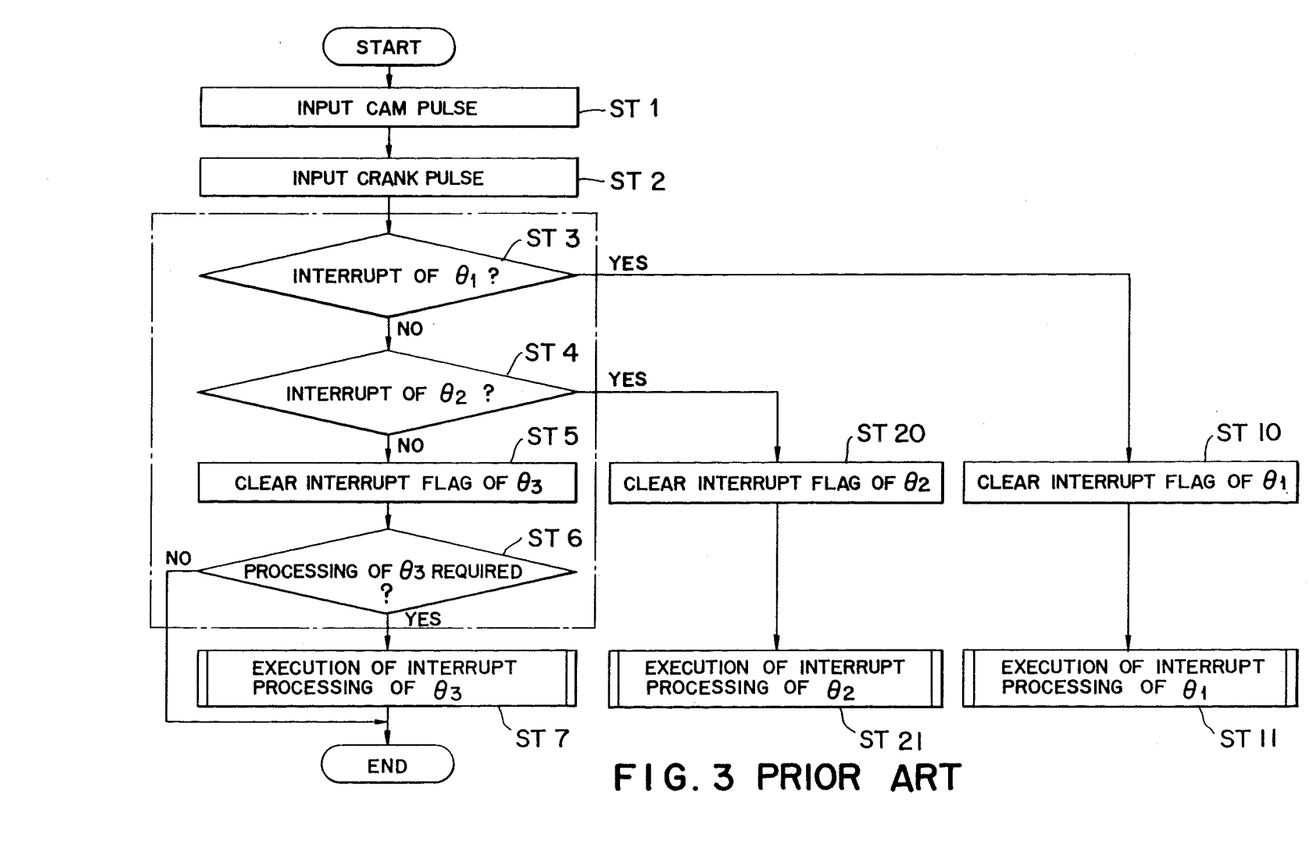
FIG. 3 is a flowchart of an interrupt program for explaining an operation of the conventional detector.

Accordingly, as shown in the flowchart of FIG. 3, the controller 4 reads a cam pulse by detecting the projection 6a of the cam rotor 6 at a step ST1. Then, at a step ST2, the controller 4 discriminates and reads a crank pulse thereinto. At the subsequent steps of the flowchart corresponding to the projection shown by single dotted lines in FIG. 3, a judgement as to what crank pulse has been read thereinto at the step ST2 is made in accordance with the cam pulse at the step ST1. For example, when the crank pulse is first input after the cam pulse, the crank pulse is judged to be a $\theta 1$ pulse at a step ST3, respective proceedings at steps ST10 and ST11 are executed as an interrupt flag of the $\theta 1$ pulse. When the crank pulse subsequent to the $\theta 1$ pulse is judged to be $\theta 2$ pulse at a step ST4, an interrupt processing of $\theta 2$ pulse is executed at steps ST20 and ST21. When it is judged that the crank pulse subsequent thereto is not the $\theta 1$ and $\theta 2$ pulses, a judgement is made as to whether or not that crank pulse is a $\theta 3$ pulse (step ST6). As a result, when the crank pulse is the $\theta 3$ pulse, the interrupt of the $\theta 3$ pulse is executed at a step ST7 at the time of starting the engine. When the crank pulse read in at the step ST2 is the $\theta 3$ pulse (fixed ignition signal), the judgement at the step ST6 is defined as a processing for making a judgement as to whether or not a signal processing of the $\theta 3$ pulse is required.

In this instance, the $\theta 3$ pulse (fixed ignition signal) is required only at starting the engine, but is not required after complete firing.

However, since the above-mentioned respective crank pulses are sensed by the single crank angle sensor 3a, they are all input to the same interrupt request terminal. Accordingly, when the controller 4 is provided with the $\theta 3$ pulse after starting, a judgement will be made as to whether or not interrupt processing of the $\theta 3$ pulse is required. The load upon the software is therefore increased accordingly.

When the engine speed is low, the interval between crank pulses is long and there is a relative margin in the processing ability. On the contrary, when the engine speed reaches a higher value (e.g., 6000 to 7000 r.p.m.), the interruption load upon the software becomes large. Thus, it is likely that the computational processing ability of a microcomputer as the controller would become insufficient, and control performance for the engine would be lowered as a result.

It is to be noted that when a microcomputer having a fast computational processing speed and a large capacity is used, insufficiency in the computational processing ability is eliminated, but the cost is increased accordingly.

SUMMARY OF THE INVENTION

An object of the present invention is to provide a crank angle detector for controlling the engine without increasing the capacity of a microcomputer, and without producing an interruption load upon the software even if the engine rotates at high speed.

To achieve this object, a crank angle detector for an engine according to this invention is characterized in that projections as a reference for calculating a crank angle and the engine speed are provided on rotor plates rotating in synchronism with a crank shaft of the engine, that a projection for indicating a fixed timing at starting the engine is provided on the other rotor plate, that crank angle sensors for sensing the respective projections to output angular signals are provided opposite to the rotor plates, respectively, and that the crank angle sensor for sensing the fixed ignition timing is connected to a maskable interrupt terminal provided in a controller.

In the above construction, when a pair of rotor plates rotate in synchronism with the rotation of the crank shaft of the engine, the crank angle sensor provided opposite to one of the pair of rotor plates senses the projection provided on one rotor plate. Thus, the sensor outputs an angular signal as a reference in calculating a crank angle and the engine speed.

Moreover, another crank angle sensor provided opposite to the other pair of rotor plates senses the projection provided on the other rotor plate. Thus, the sensor outputs a fixed ignition signal when the engine starts.

At starting the engine, output signals from the respective crank angle sensors are input to the interrupt terminal provided in the controller. The signals are then subjected to a predetermined interrupt processing.

On the other hand, after the engine starts, the interrupt terminal connected to the crank angle sensor for sensing the fixed ignition timing is masked. Thereafter, an interruption of an output signal from the crank angle sensor for sensing the fixed ignition timing is inhibited.

DETAILED DESCRIPTION OF THE PREFERRED EMBODIMENTS

Preferred embodiments of a crank angle detector according to the present invention will now be described with reference to FIGS. 4 to 10.

Initially, the entire configuration of a detector according to a preferred embodiment will be described in accordance with FIG. 4.

Figure 4:
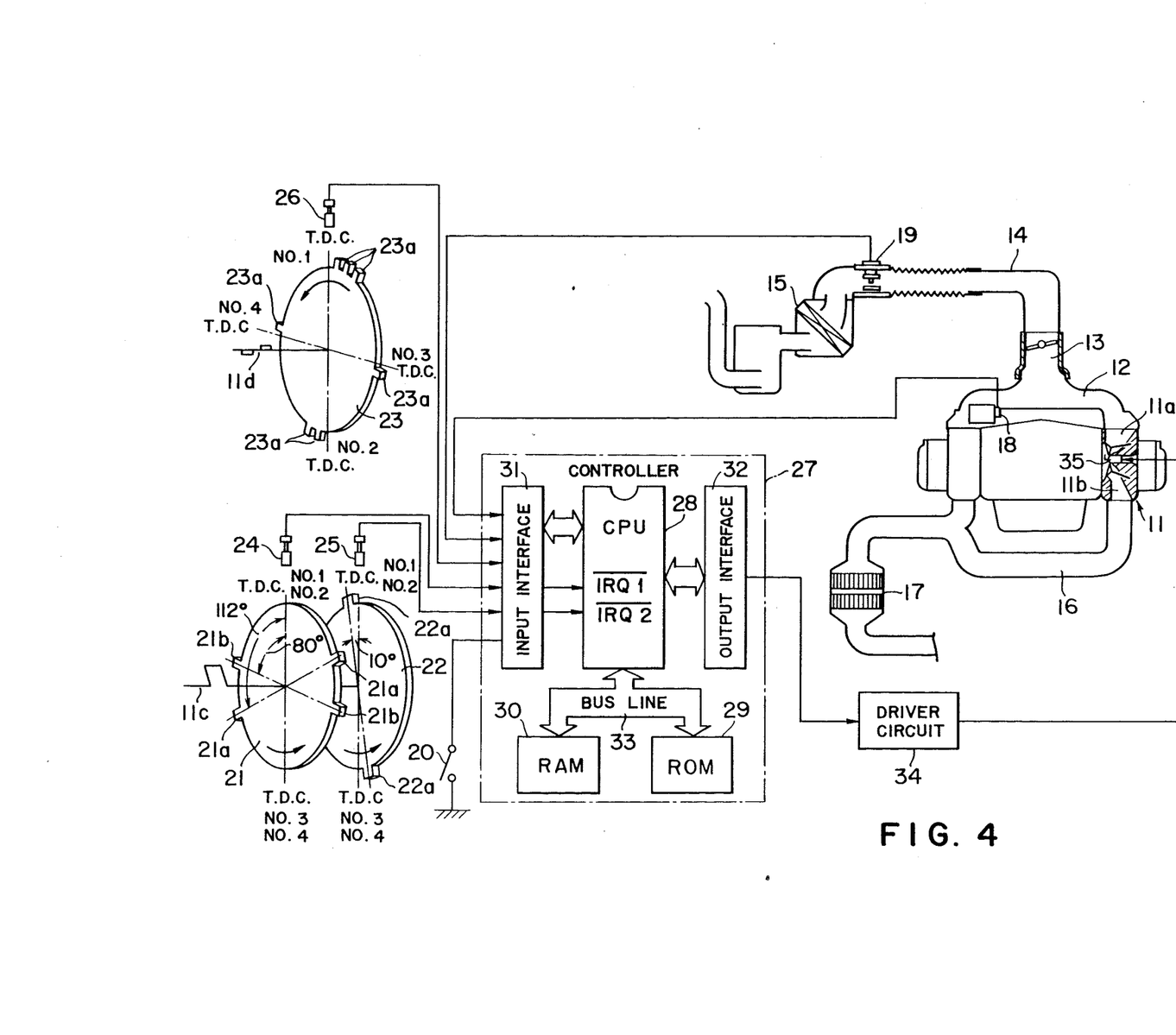
FIG. 4 is a schematic diagram showing an entire configuration of a crank angle detector according to the present invention.

As shown in FIG. 4, there is provided an engine 11. A throttle chamber 13 communicates with an intake port 11a of the engine 11 through an intake manifold 12. An air cleaner 15 communicates with the throttle chamber 13 on the downstream side thereof through an intake pipe 14.

A catalytic converter 17 is provided in a middle of an exhaust pipe 16 communicating with an exhaust port 11b of the engine 11.

Furthermore, a coolant temperature sensor 18 is inserted in a coolant passage (not shown) of a riser formed in the intake manifold 12. Moreover, an intake air flow sensor 19 is provided on the downstream side of the air cleaner 15.

In addition, the engine 11 includes a starter switch 20.

On the other hand, a crank rotor 21 for the engine speed and a crank rotor 22 for fixed ignition timing are axially secured to a crank shaft 11c of the engine 11. Furthermore, a cam plate 23 for discrimination of cylinders is axially secured to a cam shaft 11d.

Figure 5:
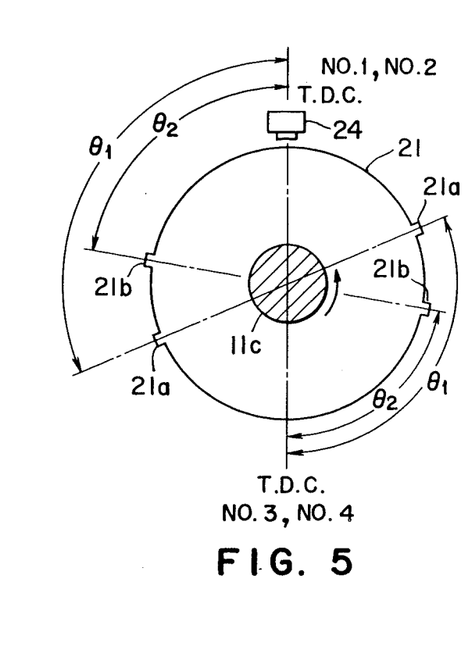
FIGS. 5 to 7 are front views showing rotor plates for the engine speed, the fixed ignition timing and discrimination between cylinders, respectively.

As shown in FIG. 5, projections 21a and 21b are formed at each position from TDC$-\theta 1$, $\theta 2$ (e.g., $\theta 1 = 112°$, $\theta 2 = 80°$) of respective cylinders on an outer periphery of the crank rotor 21 for the engine speed.

Figure 6:
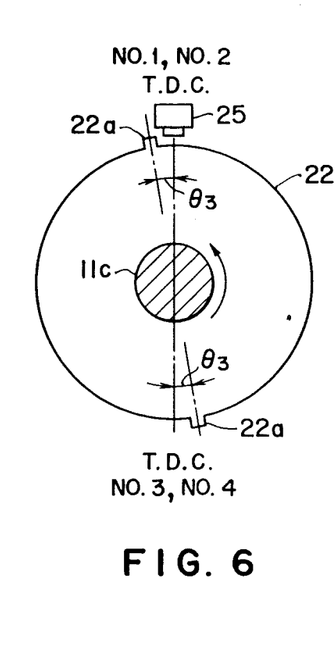

As shown in FIG. 6, projections 22a are formed at a position of BTDC $\theta 3$ (e.g., $\theta 3 = 10°$) of the respective cylinders on the outer periphery of the crank rotor 22 for a fixed ignition timing.

It is to be noted that respective projections 21a, 21b and 22a may be in the form of notches.

Figure 7:
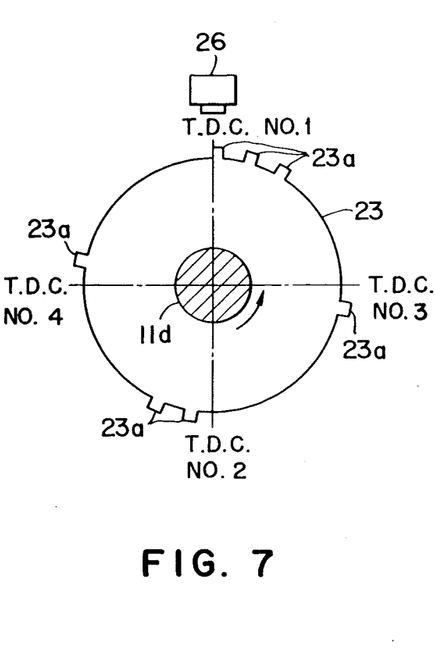
Figure 8:
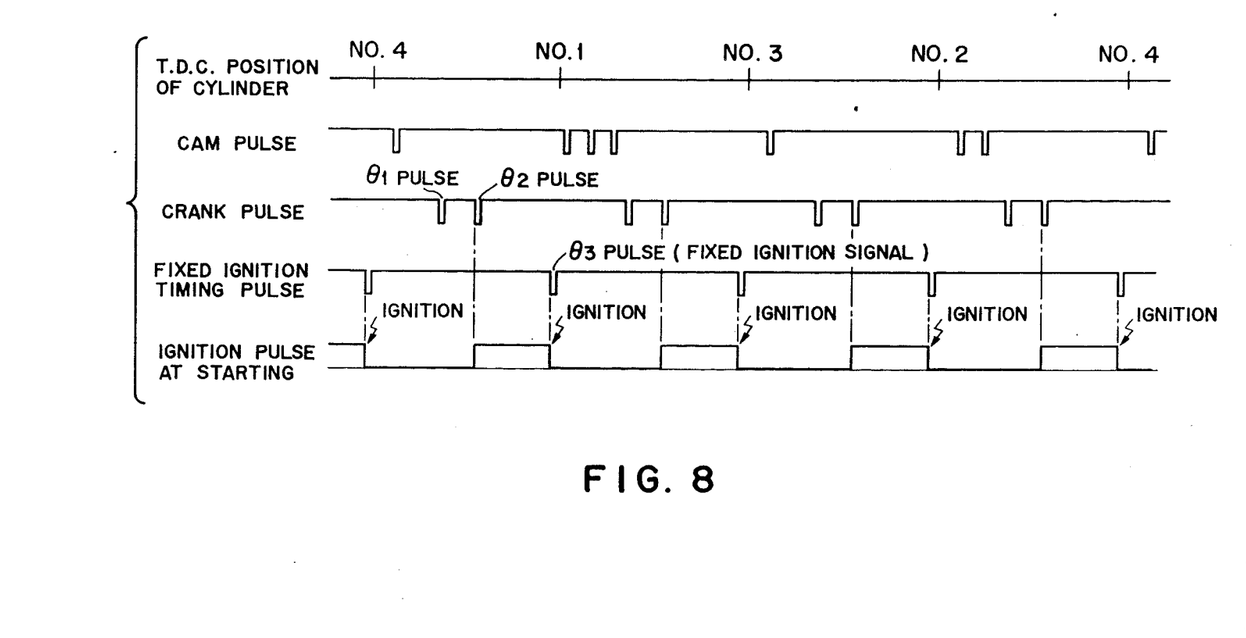
FIG. 8 is a timing chart showing cam pulses, crank pulses and starting ignition pulses at starting.

Furthermore, as shown in FIG. 7, projections 23a are formed on an outer periphery of the cam rotor 23 for discrimination between cylinders. The number of rotations of the cam rotor 23 is one half of those of the crank rotors 21 and 22. The T.D.C. of each cylinder is at every angle of 90 degrees.

The projections 23a formed in correspondence with respective cylinders of the cam rotor 23 are set in a range such that they do not overlap with the projections 21a, 21b and 22a formed on the respective crank rotors 21 and 22. In this figure, three projections are formed at the ATDC of the first cylinder, one projection is formed at the ATDC of the third and fourth cylinders, and two projections are formed at the ATDC of the second cylinder.

In addition, the crank angle sensors 24, 25 and 26 for sensing the projections 21a, 21b, 22a and 23a are provided opposite the outer peripheries of the crank rotors 21 and 22, and the cam rotor 23, respectively.

Referring to FIG. 4, there is shown a controller 27 as a microcomputer. The controller includes a central processing unit (CPU) 28, a read only memory ROM 29, a random access memory RAM 30, an input interface 31 and an output interface 32. These components are connected to each other through a bus line 33. The respective sensors 18, 19, 24, 25, and 26 and the starter switch 20 are connected to the input interface 31. Furthermore, the output interface 32 is connected to an ignition plug 35 provided on each cylinder through a driver circuit 34.

The crank angle sensors 24 and 25 are connected to interrupt terminals IPQ1 and IRQ2 of the CPU 28, respectively. When an OFF signal is output from the starter switch 20, one interrupt terminal IRQ2 is independently masked.

In the ROM 29, control programs are stored. Further, output signals from the respective sensors after processing data and computational processing by the CPU 28 are stored in the RAM 30.

The CPU 28 sets ignition timings using various data stored in the RAM 30 in accordance with a control procedure by a control program stored in the ROM 29.

The operation of the embodiment will now be described in accordance with the flowchart of FIG. 10.

MAIN ROUTINE

Figure 10:
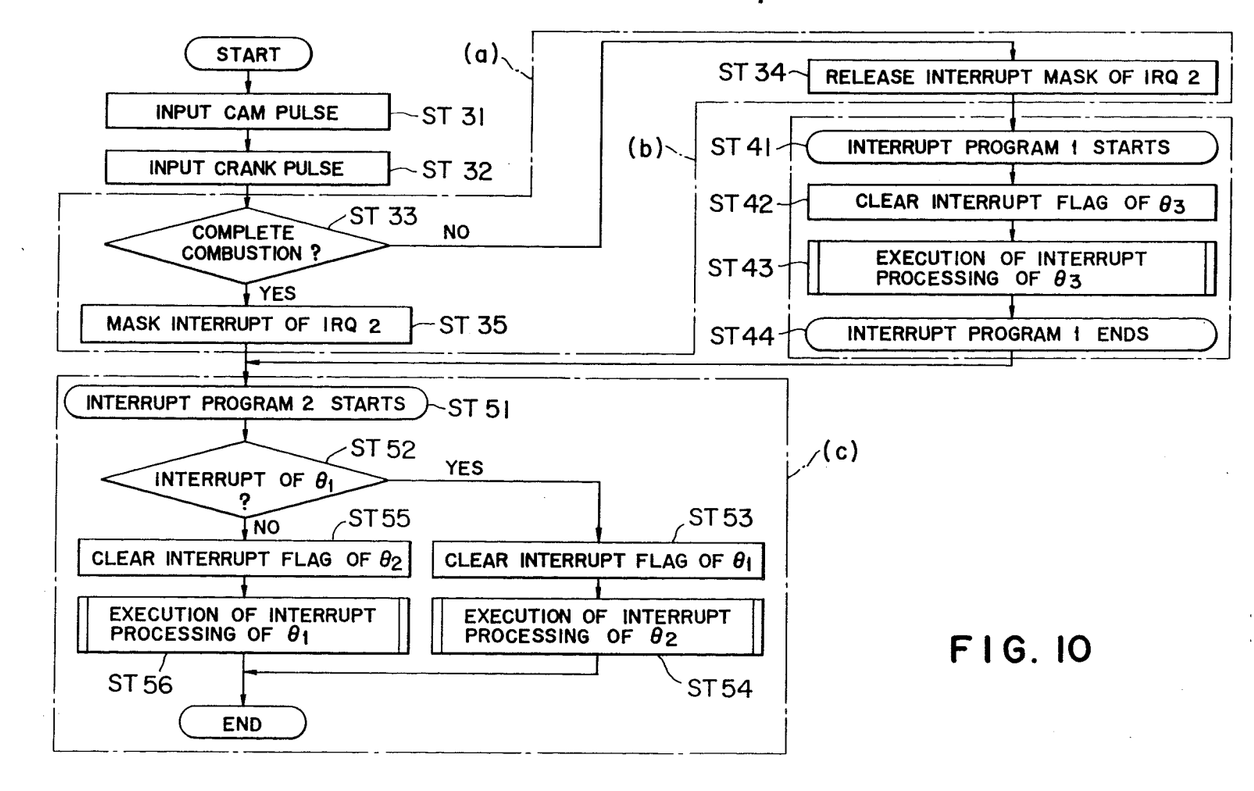
FIG. 10 is a flowchart showing an essential part of a main program, an interrupt program 1 and an interrupt program 2.

Initially, in a main routine of a single dotted block (a) shown in FIG. 10, a cam pulse and a crank pulse are input by steps ST31 and ST32 at a beginning of a program. Then, at a step ST33, a judgement is made as to whether or not the engine 11 is in a complete firing state by an ON/OFF signal from the starter switch 20.

Namely, when the starter switch 20 is in the ON state, the engine 11 is judged to be in the starting state. Thus, the program execution proceeds to step ST34. On the other hand, when the starter switch 20 is an OFF state, the program proceeds to step ST35.

At step ST34, since the engine 11 is in the starting state, the masked state of the interrupt terminal IRQ2 of the CPU 28 provided in the controller 27 is released. The crank angle sensor 25 then takes thereinto a signal ($\theta 3$ pulse) obtained by sensing the projection 22a of the rotor plate 22. The ignition plug 35 is sparked, at the time of starting, using the $\theta 3$ pulse as a fixed ignition signal (see FIG. 8).

On the other hand, at a step ST35, the engine is judged to be in the complete firing state because the starter switch 20 is the OFF state. Then, the interrupt terminal IRQ2 is masked. This makes it impossible to provide an interrupt request for the CPU 28 of a signal ($\theta 3$ pulse) input to the interrupt terminal IRQ2 at the subsequent steps of the program.

The $\theta 3$ pulse serves to output a fixed ignition signal at the time of starting. After the engine 11 has been brought into the complete firing state, the $\theta 3$ pulse is not required any more. Accordingly, by masking the $\theta 3$ pulse after the complete firing, the load upon the software can be lessened. As a result, insufficiency in the ability of the CPU 28 is eliminated.

INTERRUPT PROGRAM 1

On the other hand, when the interrupt mask to the interrupt terminal IRQ2 is released at the step ST34 and when an interrupt request for CPU 28 is provided from the interrupt terminal IRQ2, main program steps, and the interrupt processing of the interrupt program 1 is executed.

Namely, as shown by the single dotted block (b) in FIG. 10, initially the program 1 starts at step ST41. Then, the interrupt flag of the $\theta3$ pulse at step ST42 is cleared to execute the interrupt processing (output of a fixed ignition signal) of the $\theta3$ pulse at step ST43. When the interrupt program is completed (step ST44), the program returns to the main routine.

INTERRUPT PROGRAM 2

When the interrupt request for CPU 28 is provided from the interrupt terminal IRQ1 during execution of the main program, execution of the interrupt program 2 is started (step ST51).

Namely, as shown by the single dotted block (c) in FIG. 10, the interrupt program 2 proceeds with a discrimination as to whether or not the interrupt request is in correspondence with the $\theta1$ pulse.

Figure 9:
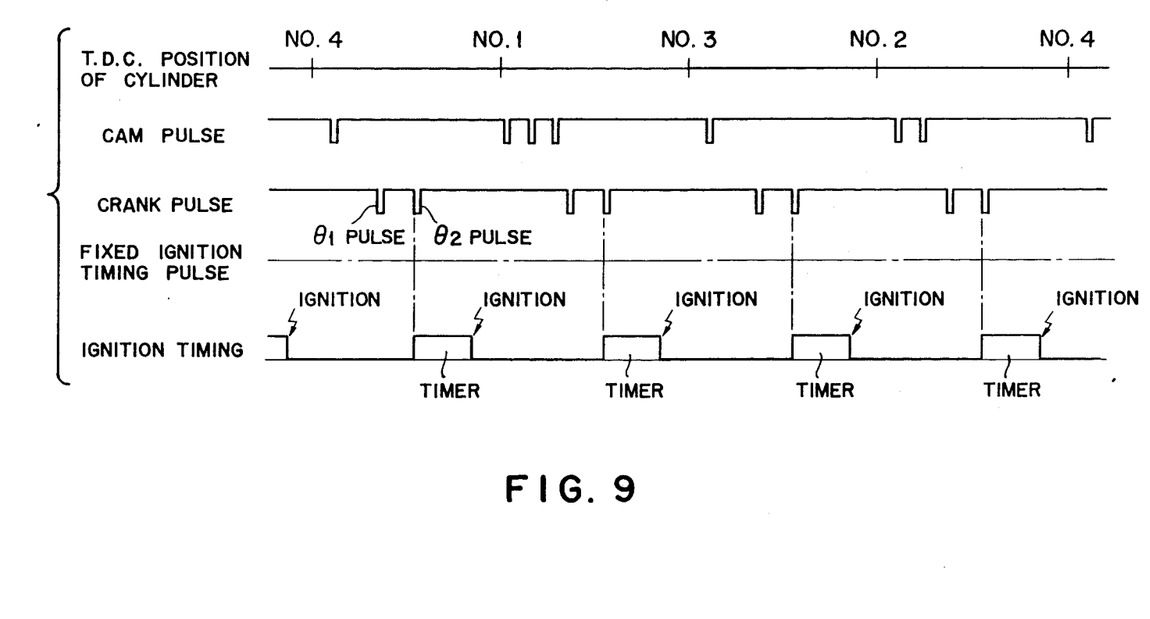
FIG. 9 is a timing chart showing cam pulses, and crank pulses during an ordinary operation.

As described above, a signal (cam pulse) produced in response to detection of the projection 23a of the cam rotor 23 is output from the crank angle sensor 26. As shown in FIG. 9, since the cam pulse is input before the $\theta1$ pulse is carried out by detecting that cam pulse.

When it is judged from the cam pulse that the interrupt request is the $\theta1$ pulse, the program proceeds to step ST53. At step ST53, the interrupt flag of the $\theta1$ pulse is cleared. Then, at step ST54, the interrupt processing of the $\theta1$ pulse (time counting start signal in calculating an angular velocity in the time control system) is executed.

On the other hand, when it is judged at the step ST52 that the interrupt request input to the interrupt terminal IRQ1 is a $\theta2$ pulse, the program execution proceeds to step ST55. At step ST55, the interrupt flag for the $\theta2$ pulse is cleared. Then, at step ST56, the interrupt processing for the $\theta2$ pulse (time counting end signal in calculating the angular velocity in the time control system, or a crank angle signal as a reference of the ignition timing) is executed.

In the main program, an angular velocity, the number of engine revolutions, an ignition time having a $\theta3$ pulse as a reference crank angle are calculated in dependency on various process in the interrupt program.

As stated above, after the engine 11 has been brought into the complete firing state, the interrupt of the crank angle signal ($\theta3$ pulse) indicating a fixed ignition timing is masked. This masking eliminates the possibility that an interrupt request occurs for CPU 28. As a result, even if the engine 11 rotates at a high speed, there is no possibility that a load upon the software occurs. Consequently, the insufficiency in ability of CPU 28 is eliminated and thus, the engine 11 is suitably controlled.

As described above, in accordance with this invention, the projections serving as the reference in calculating the crank angle and the engine speed, are provided on the pair of the rotor plates synchronously rotating with the crank shaft of the engine. Furthermore, the projections indicating the fixed ignition timing at starting are provided on the other rotor plate. Furthermore, the crank angle sensors for sensing the projections to output the angular signal are provided opposite to the rotor plates, respectively. In addition, the crank angle sensors for sensing the fixed ignition timing are connected to the maskable interrupt terminal provided in the controller for controlling the engine. Thus, the crank angle detector advantageously provides a suitable control of the engine without increasing the capacity of the controller, and without producing an overhead of an interrupt even if the engine rotates at a high speed.

While the presently preferred embodiments of the present invention have been shown and described, it is to be understood that these disclosures are for the purpose of illustration and that various changes and modification may be made without departing from the scope of the invention as set forth in the appended claims.

What is claimed is:

1. A crank angle detector for an engine having a plurality of cylinders, a crank shaft, a cam shaft, a crank angle sensor for sensing a rotational position of said crank shaft and for producing a crank pulse and a cam pulse, a starter switch for starting said engine and producing a start signal, and a controller responsive to said cam pulse and crank pulse sensed by said crank angle sensor to control ignition timing of said respective cylinders of said engine, comprising:

a pair of rotor plates having a plurality of projections on a periphery thereof for indicating said crank pulse, in which one of said plates calculates a crank angle and an engine speed, and the other of said plates indicates a fixed ignition timing at starting said engine;

a cam rotor plate connected to an end of said cam shaft, and having a projection on a periphery thereof for discriminating a cylinder number and for producing said cam pulse;

said controller operatively to control an ignition timing by said crank pulse indicating said fixed ignition timing when said engine is judged to be in a starting state in dependency on said start signal from said starter switch; and said controller having an interrupt terminal connected to an input interface therein for masking said interrupt terminal of said input interface to control an ignition timing when said fixed crank pulse is input and when said engine is judged to be in the complete firing state in dependency on an OFF state of said start signal from said starter switch.

2. The crank angle detector as set forth in claim 1, wherein said crank pulse for said fixed ignition timing is mask-released only at the time of starting, and is masked during a normal operation after complete firing.

* * * * *